(12) United States Patent
Kliger et al.

(10) Patent No.: US 10,938,444 B2
(45) Date of Patent: Mar. 2, 2021

(54) APPARATUS AND METHOD FOR NOISE REDUCTION IN A FULL DUPLEX REPEATER

(71) Applicant: AVAGO TECHNOLOGIES INTERNATIONAL SALES PTE. LIMITED, Singapore (SG)

(72) Inventors: Avraham Kliger, Ramat Gan (IL); Anatoli Shindler, Qiryat Ono (IL); Yitshak Ohana, Givat zeev (IL)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 0 days.

(21) Appl. No.: 16/544,956

(22) Filed: Aug. 20, 2019

(65) Prior Publication Data

US 2021/0013924 A1 Jan. 14, 2021

Related U.S. Application Data

(60) Provisional application No. 62/873,347, filed on Jul. 12, 2019.

(51) Int. Cl.
| | |
|---|---|
| *H04B 3/23* | (2006.01) |
| *H04B 3/36* | (2006.01) |
| *H04L 5/14* | (2006.01) |

(52) U.S. Cl.
CPC .............. *H04B 3/23* (2013.01); *H04B 3/36* (2013.01); *H04L 5/14* (2013.01)

(58) Field of Classification Search
CPC ... H04L 25/03834; H04L 25/08; H04L 25/20; H04L 27/2647; H04L 27/265; H04L 43/0823; H04L 5/0007; H04L 5/14; H04W 84/047; H04W 88/04; H04B 3/23; H04B 3/36

See application file for complete search history.

(56) References Cited

U.S. PATENT DOCUMENTS

| | | | |
|---|---|---|---|
| 8,139,658 B2* | 3/2012 | Tsatsanis | H04B 3/32 375/260 |
| 8,831,121 B1* | 9/2014 | Qi | H04L 27/2653 375/260 |
| 9,838,073 B2* | 12/2017 | Shi | H04L 5/0007 |
| 2003/0021237 A1* | 1/2003 | Min | H04L 43/0823 370/252 |
| 2004/0086027 A1* | 5/2004 | Shattil | H04L 27/2621 375/146 |
| 2011/0267956 A1* | 11/2011 | Yonge, III | H04L 27/2602 370/241 |

(Continued)

*Primary Examiner* — Kashif Siddiqui

(74) *Attorney, Agent, or Firm* — Morgan, Lewis & Bockius LLP

(57) ABSTRACT

A full duplex repeater includes an upstream echo canceller and noise reduction circuitry. The noise reduction circuitry is configured to receive an upstream signal from the upstream echo canceller, separate the upstream signal into a plurality of Fast Fourier Transform (FFT) blocks, multiply the upstream signal by a 100% raised cosine window, convert the upstream signal into frequency domain using FFT, clean predetermined portions of the upstream signal in the FFT blocks based on a predetermined threshold, convert the upstream signal from frequency domain to time domain using Inverse FFT; and recombine the FFT blocks.

20 Claims, 15 Drawing Sheets

(56) References Cited

U.S. PATENT DOCUMENTS

2013/0182870 A1* 7/2013 Villemoes ................ H03G 3/00
  381/99
2016/0087719 A1* 3/2016 Baggen ................ H04B 10/616
  398/120

* cited by examiner

APPARATUS AND METHOD FOR NOISE REDUCTION IN A FULL DUPLEX REPEATER

This application claims the benefit of U.S. Provisional Application No. 62/873,347, filed Jul. 12, 2019, which is incorporated herein by reference in its entirety.

BACKGROUND

Full Duplex (FDX) is a bidirectional communication system where two end nodes can send and receive signals at the same time. For example, smartphones can use FDX to transmit and receive audio simultaneously. FDX DOCSIS is an extension of DOCSIS 3.1 that can enable symmetrical services by increasing upstream capacity. Further, in FDX, the upstream and downstream traffic concurrently use the same spectrum, effectively doubling the efficient of spectrum use. FDX is enabled by broadband self-interference and echo cancellation technologies. However, FDX traditionally requires Node+0 access architecture. In other words, FDX traditionally requires that there are no amplifiers between the node and the cable modems (CM). For example, when the downstream signal goes through the power amplifier, part of the signal is repeated back and gets combined with the upstream signal, and the signals quickly become saturated preventing reliable data transmission in both directions. Node+0 network requires the deployment of more fiber Nodes closer to homes, hence increasing deployment investments significantly. Accordingly, many multiple-system operators find the Node+0 requirement forbidding.

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

SUMMARY

According to aspects of the disclosed subject matter, a full duplex repeater chip includes an echo canceller and noise reduction circuitry in the upstream direction. The noise reduction circuitry is configured to receive an upstream signal from the upstream echo canceller, separate the upstream signal into a plurality of Fast Fourier Transform (FFT) blocks, multiply the upstream signal by a 100% raised cosine window, convert the upstream signal into frequency domain using FFT, clean noisy portions of the upstream signal in the FFT blocks based on a predetermined threshold, convert the upstream signal from frequency domain back to time domain using Inverse FFT; and recombine the FFT blocks.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
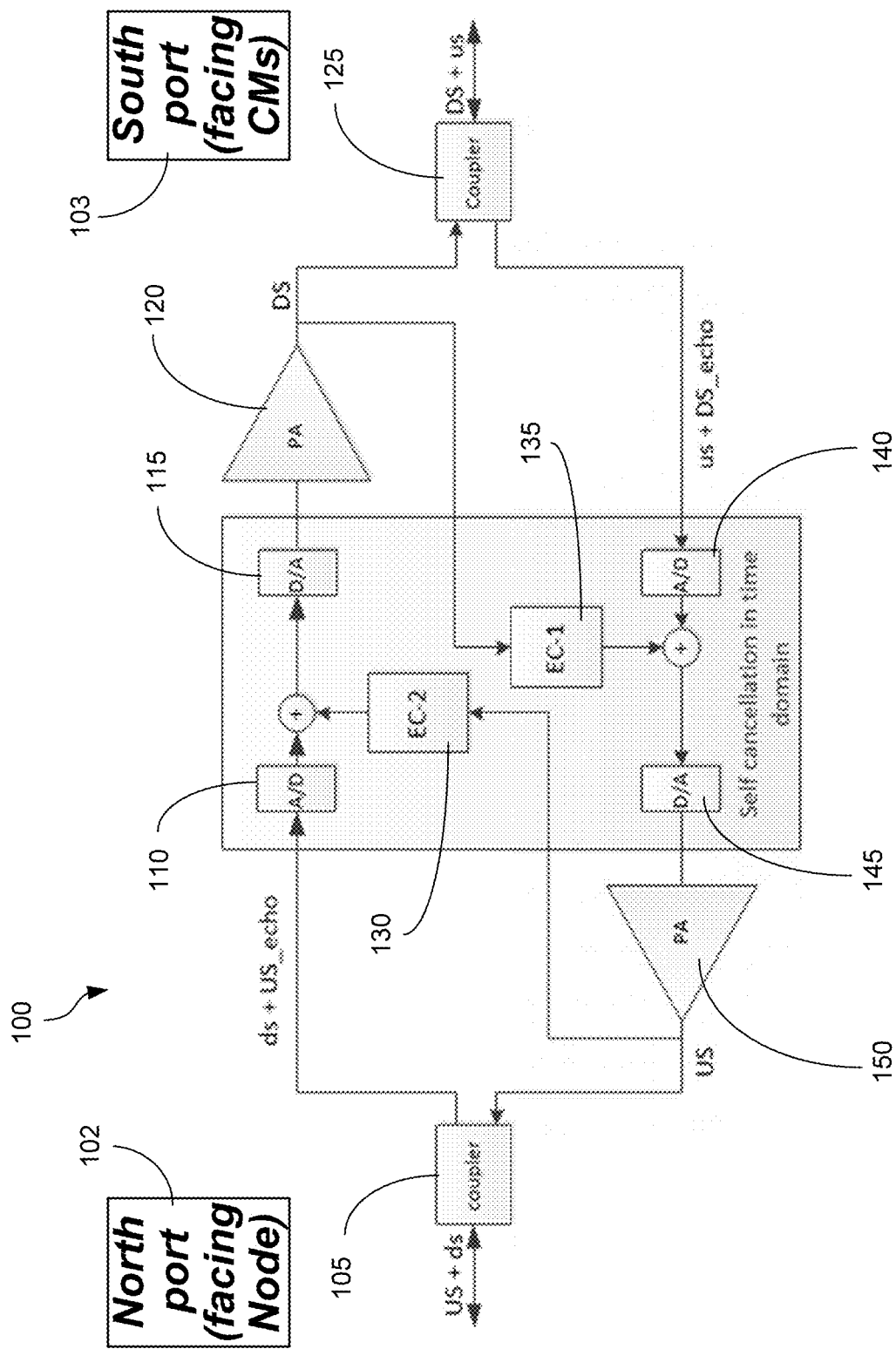
FIG. 1 illustrates an FDX repeater according to one or more aspects of the disclosed subject matter.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

In one or more aspects of the disclosed subject matter, Full Duplex (FDX) refers to data going in two directions at the same time over the same frequencies. Many multiple-system operators (MSO) have amplifiers between the node and the cable modems. Accordingly, those MSOs cannot use FDX because FDX traditionally requires that there are no amplifiers between the node and the cable modems. However, a solution that allows these MSOs to perform FDX over the amplifiers would provide a significant benefit because it would allow the MSOs to use FDX when they were previously not able to. As a result, performing FDX over the amplifiers is further described herein.

Referring now to the drawings, wherein like reference numerals designate identical or corresponding parts throughout the several views:

FIG. 1 illustrates an FDX repeater 100 according to one or more aspects of the disclosed subject matter. It should be appreciated that the FDX repeater 100 is a simplified diagram only showing self-interference cancellation related signals. It should be appreciated that self-interference cancellation and echo cancellation can be used interchangeably herein. The FDX repeater 100 illustrates a separation between downstream and upstream signals by self-interference (SI) cancellation. If the SI cancellation is higher than the combined amplifier gains, the system is stable (i.e., doesn't diverge). Additionally, there is no demodulation and/or re-modulation.

The FDX repeater 100 includes a north port (facing a node) 102 and a south port (facing cable modems) 103. The north and south port terminology are simply references to signal being "downstream" (north to south) and the signal being "upstream" (south to north), respectively. From the north port, the downstream signal arrives at a first coupler 105. The downstream signal and upstream echo arrive at a first analog-to-digital converter (ADC) 110. Next, a first echo canceller 130 cancels out the upstream echo and the downstream signal arrives at a first digital-to-analog converter (DAC) 115. The downstream signal gets amplified at a first amplifier 120 and arrives at a second coupler 125. From the south port, the upstream signal arrives at the second coupler 125. The combined upstream signal and downstream echo arrive at a second ADC 140. Next, a second echo canceller 135 cancels out the downstream echo and the upstream signal arrives at a second DAC 145. The upstream signal gets amplified at a second amplifier 150 and arrives at the first coupler 105. Without the echo cancellers, a portion of the downstream signal, for example, going through the amplifier gets repeated back and combined with the upstream signal, which then goes through the other amplifier and gets amplified again. As a result, the signals quickly become saturated and the upstream and downstream signals cannot be concurrent for FDX. In other words, the echo cancellers protect against this saturation.

Figure 2A:
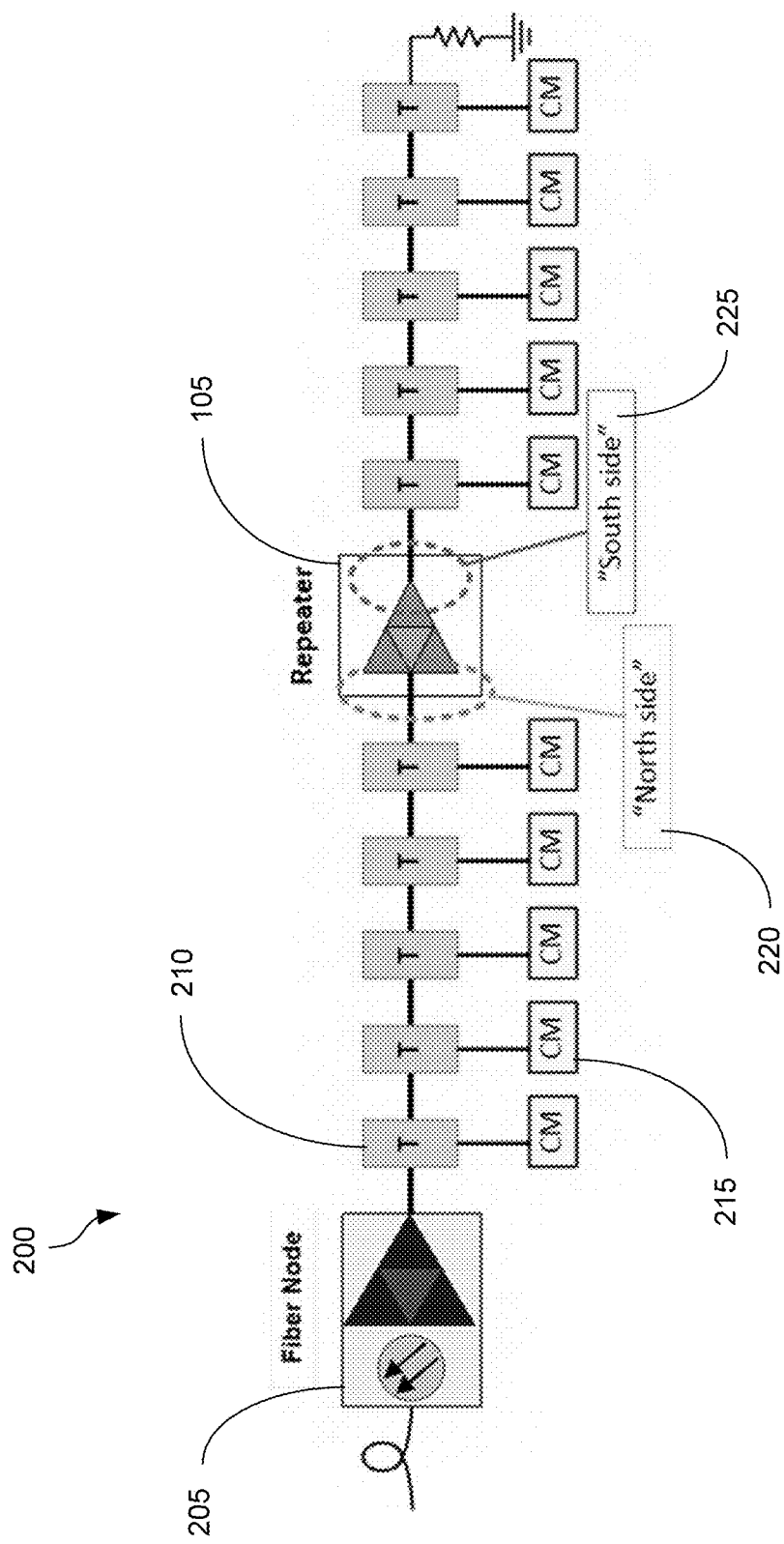
FIG. 2A illustrates an exemplary cable loop according to one or more aspects of the disclosed subject matter.
Figure 2B:
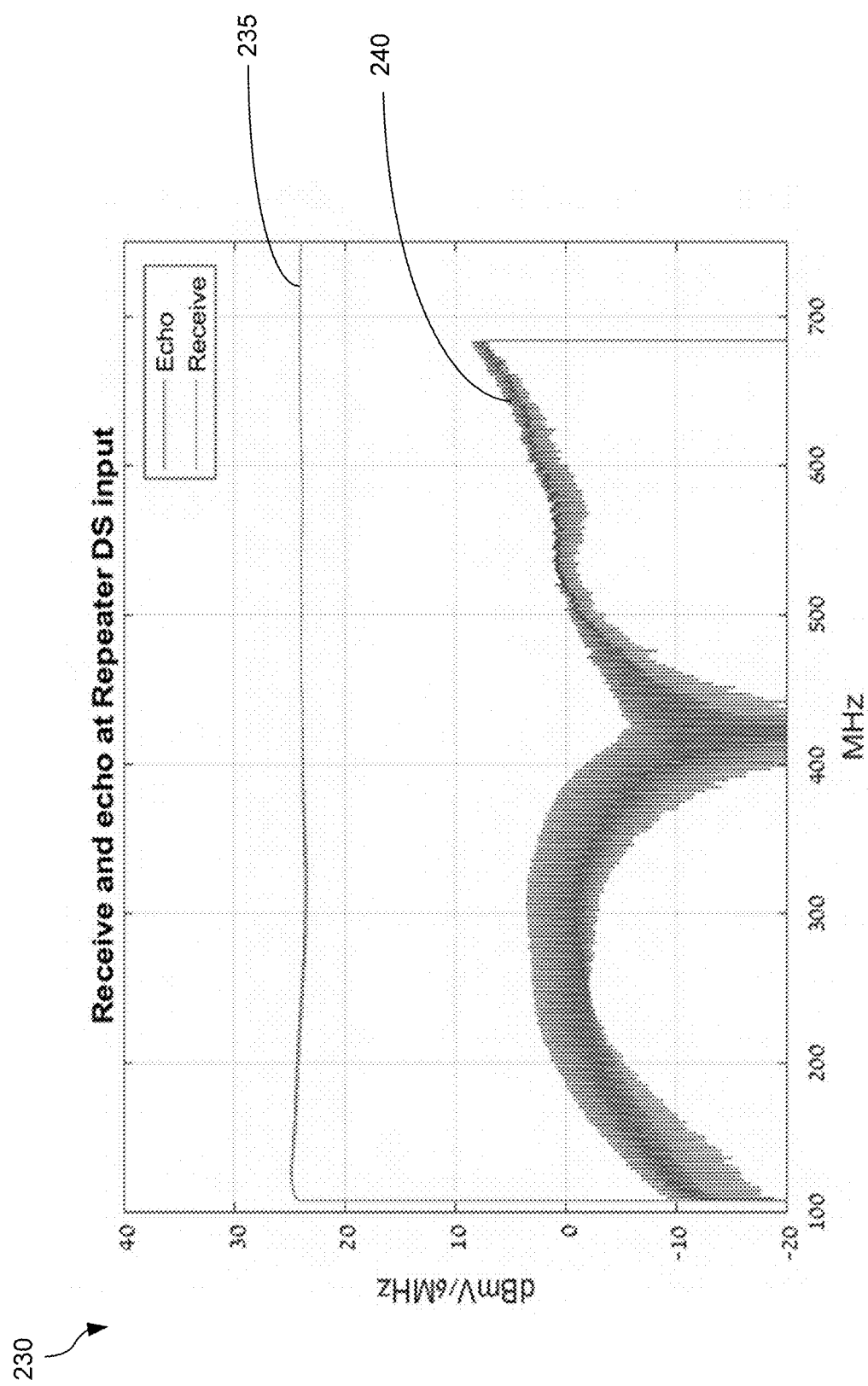
FIG. 2B illustrates a graph of received PSD and echo at the north port input according to one or more aspects of the disclosed subject matter.
Figure 2C:
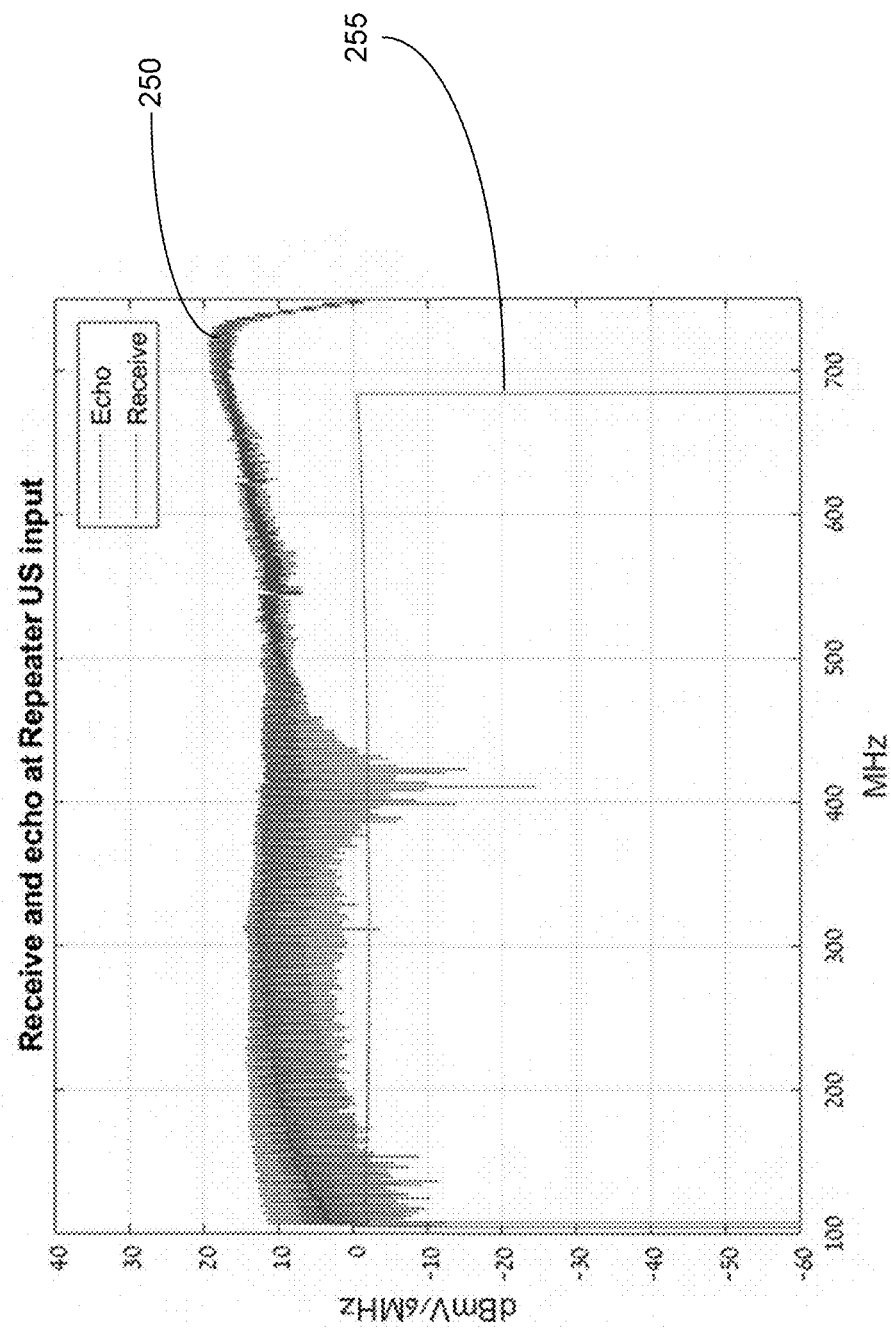
FIG. 2C illustrates a graph of received PSD and echo at the south port input according to one or more aspects of the disclosed subject matter.

FIGS. 2A-2C illustrate an exemplary repeater transmission power and power spectral density (PSD) and a corresponding noise analysis according to one or more aspects of the disclosed subject matter.

FIG. 2A illustrates an exemplary cable loop 200 according to one or more aspects of the disclosed subject matter. The cable loop 200 can include a fiber node 205. A plurality of taps 210 distribute a portion of the signal to a respective plurality of cable modems 215. When the signal is exhausted, the signal can be amplified via a repeater (e.g., the FDX repeater 105) for FDX functionality. Additionally, a north side 220 of the FDX repeater can face the fiber node 205, and a south side 225 of the FDX repeater can face away from the fiber node 205 (i.e., opposite the north side). In other words, the north side 220 can correspond to the north port 102 in FIG. 1, and the south side 225 can correspond to the south port 103 in FIG. 1.

In one aspect, regarding the repeater transmission power and the power spectral density (PSD), the downstream (south port) complies with FDX requirements with 3.9 dB drop of PSD above 1006 MHz, a 21 dB uptilt between 108 MHz and 1218 MHz prior to drop, and an output power of 72 dBmV. The upstream (north port) can set transmission power and PSD to arrive at the node with a flat PSD of 5 dBmV/6.4 MHz, a repeater output power of 44 dBmV, and a transmission power lower than required for CMs.

FIG. 2B illustrates a graph 230 of received PSD 235 and echo 240 at the north input according to one or more aspects of the disclosed subject matter. Here, the signal is higher than the echo. For example, the composite power includes a received downstream signal of 46 dBmV, a received downstream power of 44 dBmV in FDX band (average PSD of about 26.5 dBmV/6 MHz), and a received echo of 20 dBmV. Accordingly, a composite received power to echo ratio is +24 dB and a signal-to-noise ratio (SNR) of downstream signal to echo is 22-30 dB. In other words, the echo is between 22-30 dB lower than the signal.

FIG. 2C illustrates a graph 245 of received PSD 255 and echo 250 at the south input according to one or more aspects of the disclosed subject matter. Here, the echo is higher than the signal. For example, the composite power includes a received upstream signal of 18 dBmV, a received echo of 32.5 dBmV, and a received echo of 31.5 dBmV in FDX band. Accordingly, a received signal to echo ratio in the FDX band is −13.5 dB. In other words, the echo is 13.5 dB higher than the signal.

As a result, a noise analysis for the upstream and downstream path can approximate performance. In the upstream path, from the cable modem to the fiber node, the performance is mainly limited by the echo cancellation performance. In the downstream path, from the fiber node to the cable modem, the performance is limited by the performance of the power amplifier rather than the echo canceller. This is based on the echo being lower than the signal in the downstream path as shown in FIG. 2B. In other words, the echo is easier to remove from the downstream path and the addition of FDX may only slightly affect the performance in the downstream. However, the performance is still limited by the performance of the power amplifier. This is not the case in the upstream path where the echo is higher than the received signal so the uncanceled echo becomes the dominant interference. Here, the performance will be limited by the performance of the echo canceler, which is described further herein.

Figure 3:
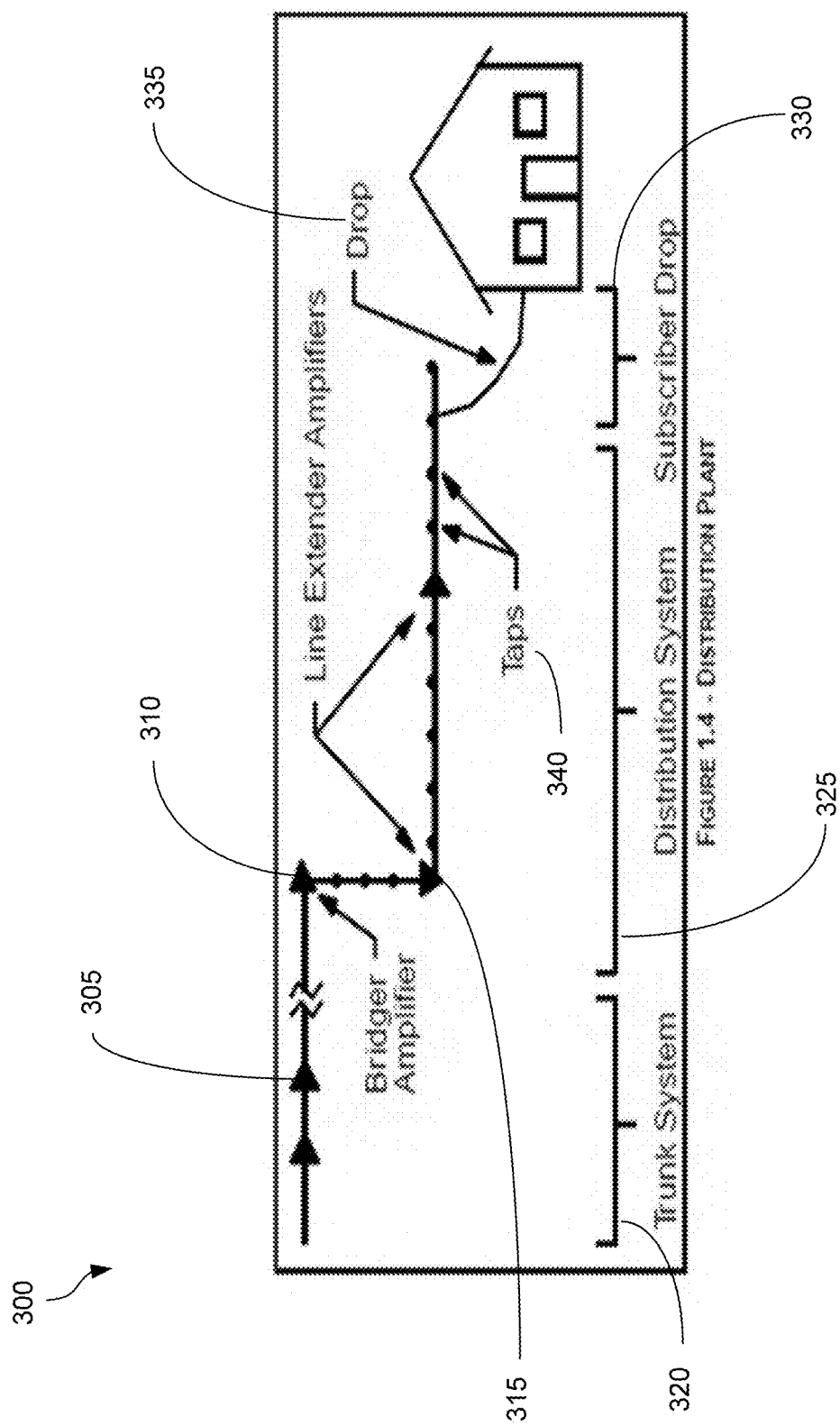
FIG. 3 illustrates an exemplary tree network architecture according to one or more aspects of the disclosed embodiment.

FIG. 3 illustrates an exemplary tree network architecture 300 according to one or more aspects of the disclosed embodiment. The tree network architecture 300 can include a trunk system 320, a distribution system 325, and a subscriber drop 330. The subscriber drop 330 can represent a drop 335 from a tap (e.g., tap 340). Additionally, the tree network architecture 300 can include various types of radio frequency (RF) amplifiers, and the types of RF amplifiers can be based on their location in the network.

A first type of RF amplifier in the tree network architecture 300 is a trunk amplifier (e.g., trunk amplifier 305). The trunk amplifier 305 can represent one or more trunk amplifiers in the trunk system 320. More specifically, trunk amplifiers are moderate-gain amplifiers with a high carrier-to-noise ratio (CNR) and lower nonlinear distortions. An incoming signal of 30-36 dBmV can be used to provide a high CNR with low nonlinear distortions, for example.

A second type of RF amplifier in the tree network architecture 300 is a bridger amplifier (e.g., bridger amplifier 310). The bridger amplifier 310 can represent one or more bridger amplifiers in the distribution system 325. More specifically, the bridger amplifier 310 usually has two or three amplifiers in the downstream direction and be used to split the transmitted signals to up to four feeder cables.

A third type of RF amplifier in the tree network architecture 300 is a line extender amplifier (e.g., line extender amplifier 315). Line extender amplifier 315 can represent one or more line extender amplifiers in the distribution system 325.

In other words, from the downstream side, the signal (e.g., from the fiber node) is distributed between the amplifiers and arrives at the cable modems, and from the upstream side, the signals from the plurality of cable modems are combined at the bridger amplifiers. Additionally, it should be appreciated that FIG. 3 shows one output from the bridger amplifier, but the tree network architecture 300 can include a plurality of bridger amplifiers where each one of the bridger amplifiers connects to a row of line extenders, for example. Additionally, it should be appreciated that sometimes branches can be created by taps that are inserted between amplifiers instead of bridgers.

Figure 4:
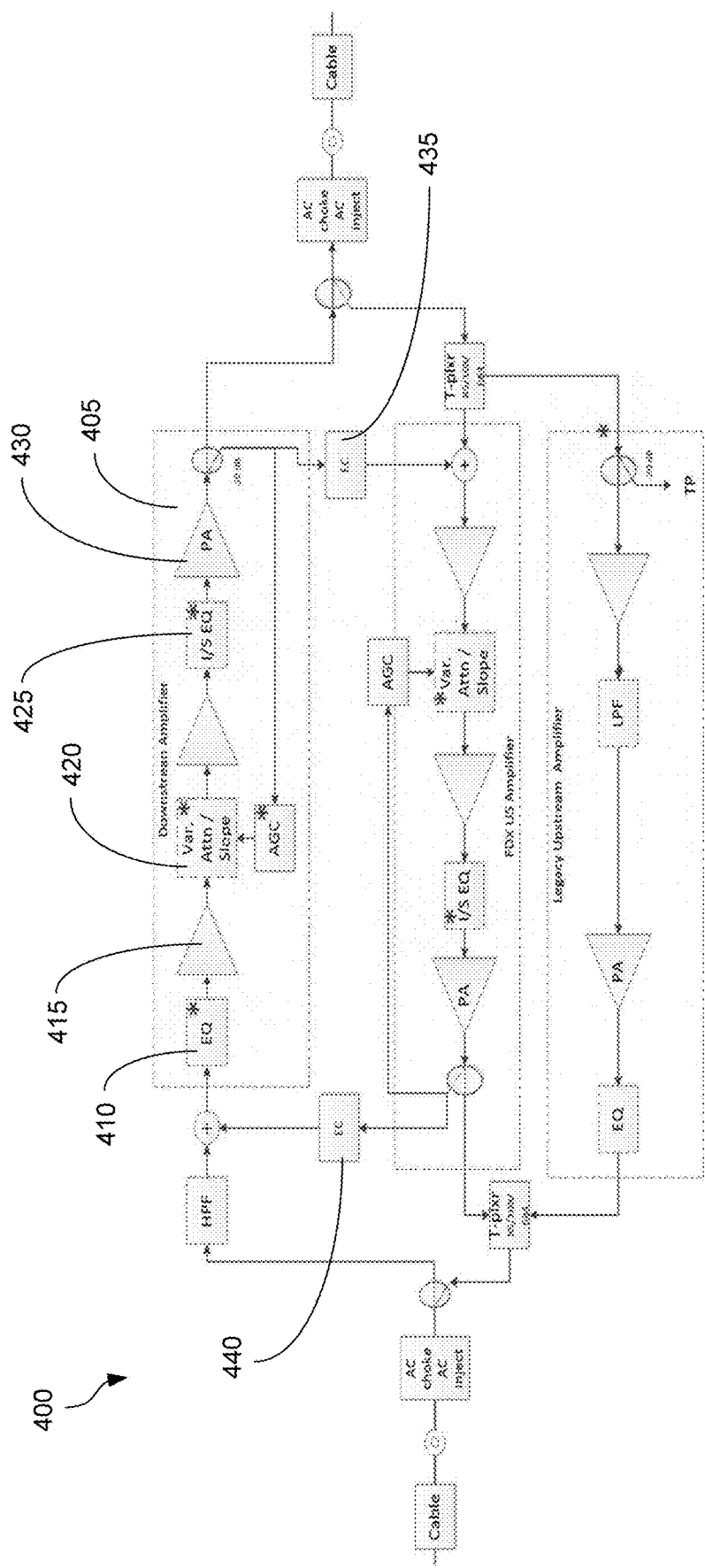
FIG. 4 illustrates an exemplary echo canceller approach using existing amplifiers according to one or more aspects of the disclosed subject matter.

FIG. 4 illustrates an exemplary echo canceller approach 400 using existing amplifiers according to one or more aspects of the disclosed subject matter. For example, a typical downstream power amplifier set up (e.g., downstream amplifier 405) can include an equalizer 410, a pre-amplifier 415, a variable attenuator 420 and an interstage (I/S) equalizer 425 to correct for temperature changes and gain changes, and a power amplifier 430. In this traditional amplifier set up, the equalizer 410 and the interstage equalizer 425 can be used for pre-equalizing the frequency response of the cable after the PA (e.g., based on uptilt). The downstream signal can then be uptilted, and the uptilt is performed so the PA output arrives flat at the cable modem. More specifically, as the signal goes through the taps (e.g., taps 330), the signal undergoes a downtilt frequency response. As a result, the PA output is uptilted so that the signal arrives flat to the cable modem. However, when there are multiple repeaters, a repeater will transmit an uptilted signal to the next repeater, but after the cable modem, the signal will arrive flat. As a result of the signal arriving flat after the cable modem, the signal will need to get uptilted again. Therefore, the role of the equalizer includes measuring the frequency response of the cable section before the repeater and equalizing the PA output accordingly. In addition, the amplifier output frequency response is controlled to compensate for cable frequency response variations as well as PA and taps gain and frequency response variations over time (e.g., due to temperature change) using the variable gain and slope equalizers. Similarly, the upstream path also includes a pre-equalizer and a variable attenuator and slope equalizer. The AGC in both downstream and upstream are used to control the variable gain and slope equalizers.

In the south and north ports, two echo cancellers (e.g., a first echo canceller 435 and a second echo canceller 440) can be added to the amplifier. The echo cancellers, the variable attenuators, the AGC, and the equalizers can be implemented digitally within a chip. Further, all components illustrated with an asterisk in FIG. 4 can be implemented digitally. Advantages of implementing these components digitally include both cost and power savings, as well as performance improvement.

Figure 5A:
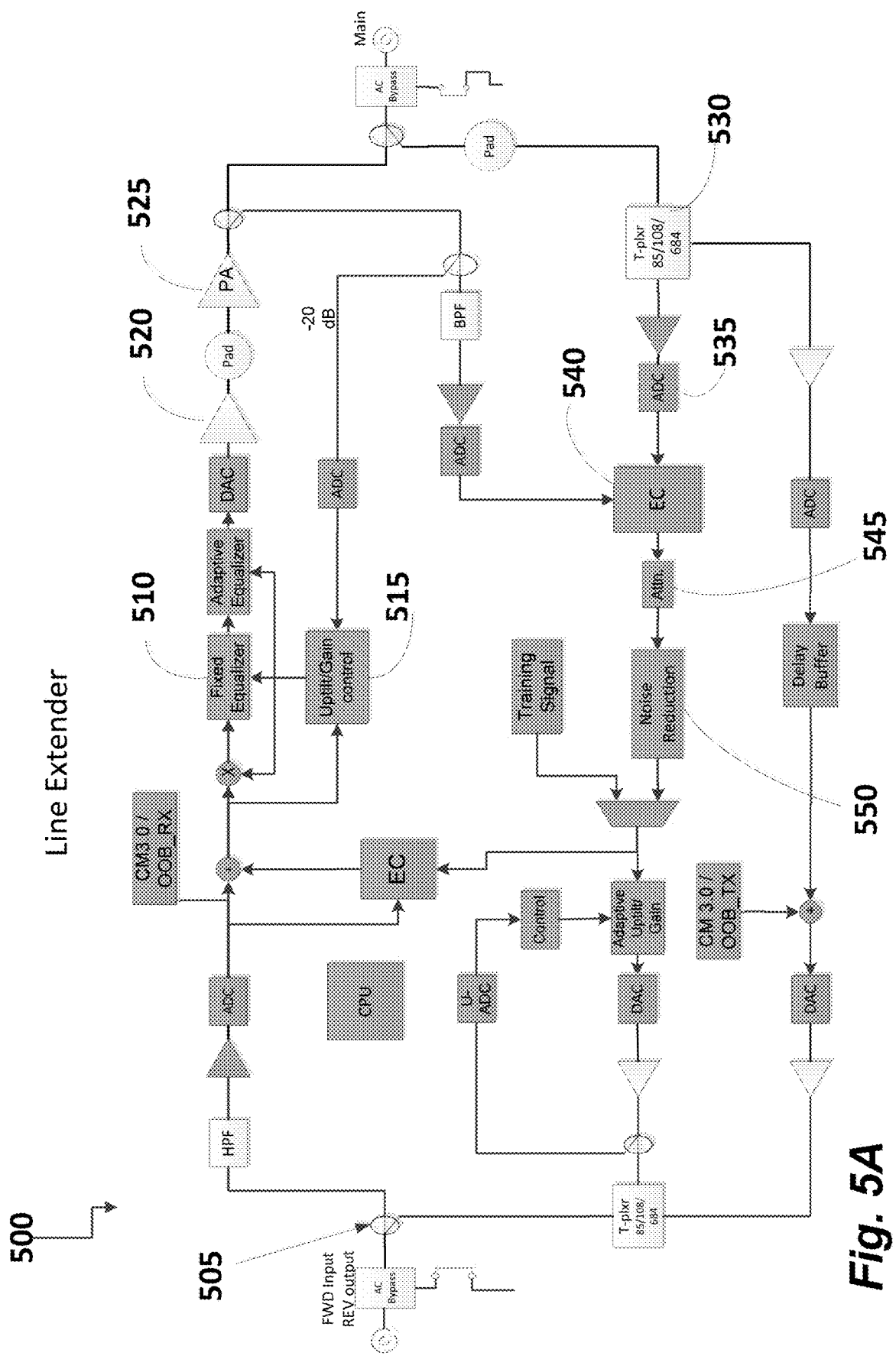
FIG. 5A illustrates an exemplary block diagram of a line extender repeater implementation according to one or more aspects of the disclosed subject matter.

FIG. 5A illustrates an exemplary block diagram of a line extender repeater implementation 500 according to one or more aspects of the disclosed subject matter. Referring to FIG. 5, the shaded blocks represent digital components and the white blocks represent analog components. Generally, starting from the node (e.g., the node being off a left side of the block diagram), the block diagram includes a coupler 505 that splits or combines upstream and downstream signals. The downstream signal then arrives at the digital processor (where shaded blocks represent digital components). Next, a fixed configurable line equalizer 510 compensates for the frequency response of the loop between this repeater and the previous transmitter (e.g., a node or another repeater). There can also be a variable equalizer (e.g., variable equalizer 515) to compensate for frequency and gain changes.

Next, a pre-amplifier (e.g., pre-amplifier 520) distributes the signal to an analog portion of the repeater chip 500. In this example, the pre-amplifier 520 distributes the signal to one to three power amplifiers, 525. One power amplifier in case of a line extender repeater (shown in the figure), two or three power amplifiers in case of a bridger. Each distributed signal then goes through a respective coupler to a cable (i.e., the other side of the repeater). In other words, in this example, there is one input and one output, but in another example there could be one input and two or three outputs (i.e., two or three branches).

The signal that is incoming on the south side is combined together in the case of a bridger amplifier with another coupler, and goes through one of the outputs of the triplexer, 530, that passes the FDX band (for example 108-684 MHz) and arrives at an ADC (e.g., ADC 535), and then goes into an echo canceller (e.g., echo canceller 540). The echo canceller 540 also receives the output from the one, two or three PAs (525). As a result, the echo canceller 540 reduces the echo from the one to three PAs 525. The output of the echo canceller 540 can then go into an attenuator 545. The role of the attenuator 545 is to prevent saturation in case the echo canceller 540 cannot cancel enough of the echo. For example, the echo canceller 540 may not be able to cancel enough of the echo when the echo response is changed abruptly. The echo response may change abruptly when one of the taps is replaced, a cable is cut, and the like. When the echo response is changed abruptly, the echo canceller 540 may take some time to readjust to the new echo response, and during this time, the output of the echo canceller will be high and might go through the other PA and saturate the signal. To prevent interfering with the downstream signal, the signal being too high can be detected and the signal can be attenuated via the attenuator 545 accordingly. The signal then goes through a noise reduction block 550, and then goes through a set of equalizers similar to the downstream side.

Another output of the diplexer, passes legacy DOCSIS (LD) upstream frequencies, in case that DOCSIS3.1 is also used in the same network. The LD upstream signal may than be delayed by a delay buffer to equalize the delay of the FDX upstream and LD upstream signals through the repeater. This equalization could be needed to simplify time ranging of FDX and LD signals by the node receiver. As an example, in FDX DOCSIS initial time ranging is only one on the LD frequencies.

Figure 5B:
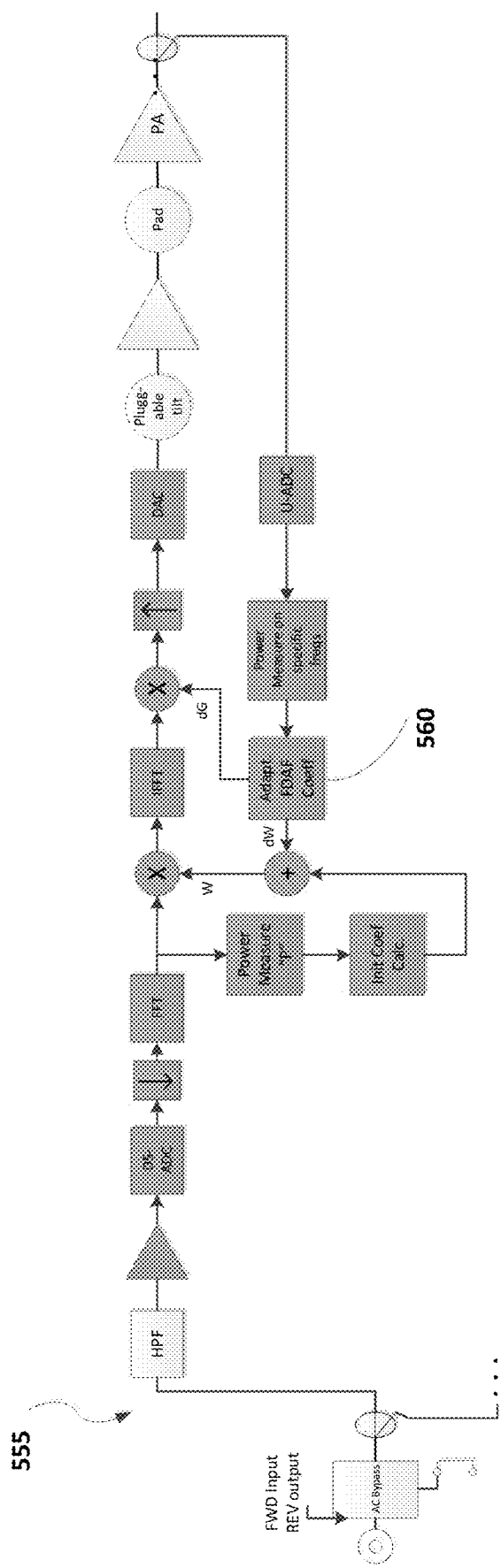
FIG. 5B illustrates a block diagram of a downstream path of the repeater according to one or more aspects of the disclosed subject matter.

FIG. 5B illustrates a block diagram of a downstream path 555 of the repeater 500 according to one or more aspects of the disclosed subject matter. More specifically, the downstream path 550 is a closer view of the downstream path of the repeater 500 in FIG. 5A. The downstream path 555 illustrates an exemplary automatic equalization implementation. Generally, downstream automatic equalization requirements include the repeaters and node being pre-configured with the required transmit frequency response and gain. Additionally, during steady state, repeaters are required to maintain the pre-configured transmit frequency response, for example, within +/−0.5 dB. Further, temperature gain controls in steady state are maintained by PA output power at two or more configurable frequencies or two or more 6 MHz channels (e.g., "pilot channel"). Additionally, after reset and once a downstream training signal is transmitted by the Node, all repeaters can sequentially set their equalizers autonomously since there is no communication with the repeaters during this time, and the Node needs to wait before starting its downstream transmissions to verify network is set appropriately.

Regarding the automatic equalization procedure for the node, the node can be pre-configured with the required output frequency response and gain, and the node can be configured to 1) transmit training signals, a wideband signal over all downstream spectrum or on pilot frequencies only, with the required PSD upon network reset, 2) wait for enough time so that all repeaters can set their equalizers, and 3) move into steady state.

Regarding the automatic equalization procedure for the repeater, repeaters are pre-configured with their required output frequency response and gain. Additionally, equalization is implemented using a Frequency Domain Adaptive Filter (FDAF) (e.g., FDAF 560). Further, upon reset, the repeater can be configured to 1) wait for a received wideband signal at the north port, 2) measure input frequency response (energy per FFT bin), 3) adjust its equalizer coefficients to maintain the required frequency response and gain, 4) once enough accuracy is achieved, the repeater can stop equalizer setting and open downstream path for transmissions, and 5) wait for a command from the CM to move into steady state, or it can move to this step autonomously after a pre-configured waiting time. Once in steady state, the repeater can be configured to 1) measure energy on selected frequencies (the configured pilot channels), 2) calculate gain and cable response, and 3) adjust filter coefficients with a programmable step size.

In other words, regarding the implementation of the equalization procedure, the equalization can be implemented with the FDAF 560. Once a training signal is detected after reset, FFT output bins power can be measured to calculate the spectrum of the arriving downstream signal, and the FDAF coefficients can be set accordingly to maintain a preconfigured frequency response at its output. Finally, when the output response is accurate enough, the repeater "opens" the DAC to begin downstream transmission. In steady state, the PA output can be monitored using the two or more pilots and FDAF coefficients are corrected accordingly. Additionally, correction step size can be set to enable tracking frequency response changes due to temperature without interfering with the CMs downstream receivers.

In addition, the measured spectrum (power per frequency bin) of the downstream signal can be used to calculate the frequency response of the cable between the preceding repeater, or node, downstream transmitter and the repeater using a pre-defined information on the transmitted spectrum of the preceding transmitter. This frequency response can be used to shape the adaptive uptilt/gain in the upstream path so that the upstream signals arrive at the next receiver in the upstream direction (repeater or node) with a pre-defined spectrum (e.g. flat spectrum).

Generally, regarding the problem of noise in amplifiers, networks can have branches that could have large numbers of amplifiers and each amplifier can have its own echo canceller, and the performance of the output of the amplifier is limited by the echo canceller. For example, in a tree structure that has 10 amplifiers, the uncancelled echo from each of the repeaters arrive at the node. The composite uncanceled echo from all repeaters in the network would actually be multiplied by 10 at the node. This corresponds to a significant reduction in the SNR. Accordingly, the noise reduction block 550 is configured to remove at least part of the uncanceled echo.

More specifically, Node+X networks that include cascaded and branched amplifiers suffer from amplifier output noise (e.g., uncanceled echo or noise from CMs or thermal noise) propagation, reducing SNR at the upstream node receivers. Degradation in upstream performance could be very significant in networks containing a large number of branched amplifiers. The improvement provided by the noise reduction block 550 is a function of the ratio of the total number of amplifiers in a distribution leg versus maximum number of amplifiers in a row (i.e., the "X" in Node+X). For example, simulations show an improvement of 3-6.5 dB in the SNR at the node receiver inputs with exemplary network examples from cable providers.

Figure 6A:
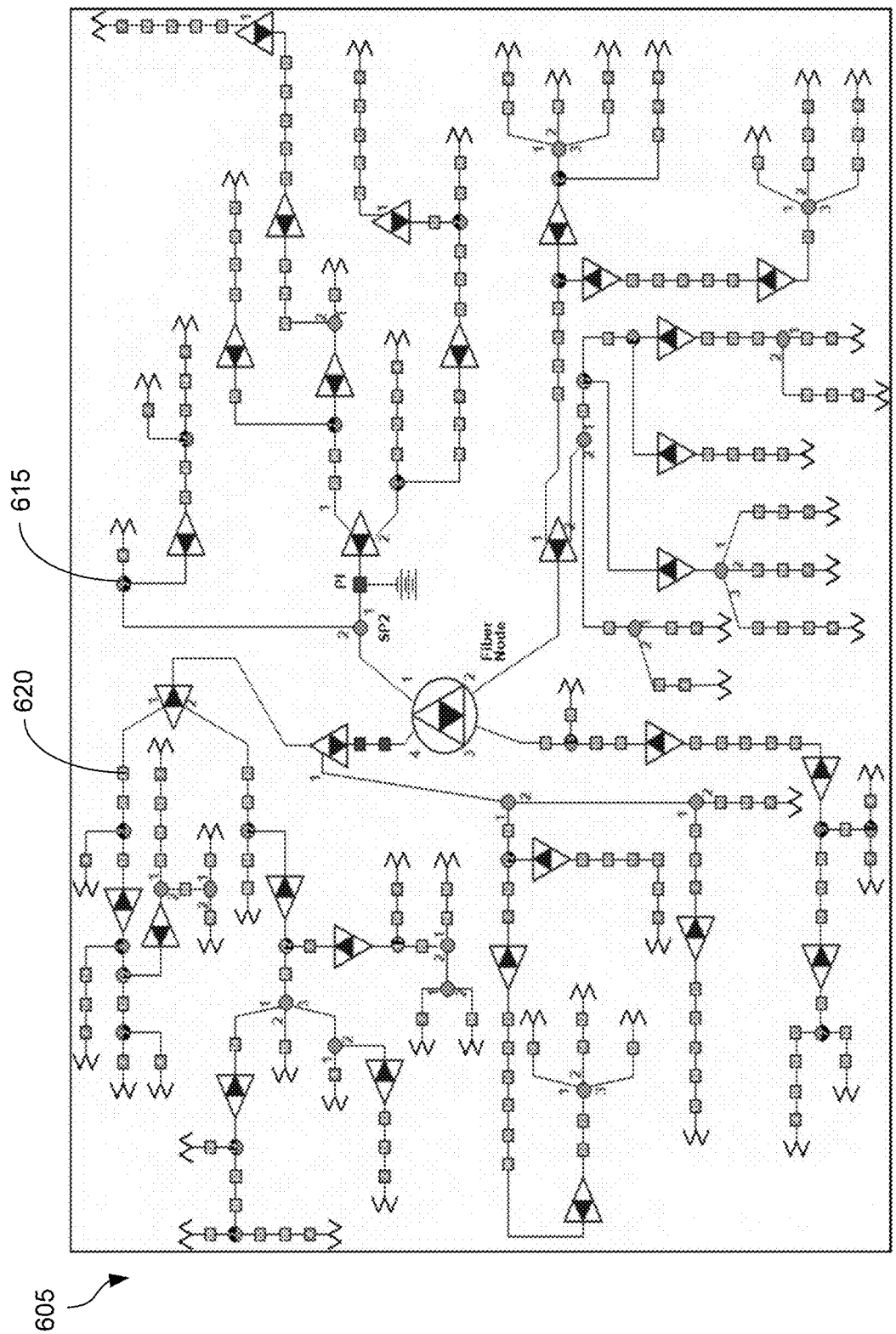
FIG. 6A illustrates noise propagation in a first exemplary large amplifier network for a cable provider according to one or more aspects of the disclosed subject matter.
Figure 6B:
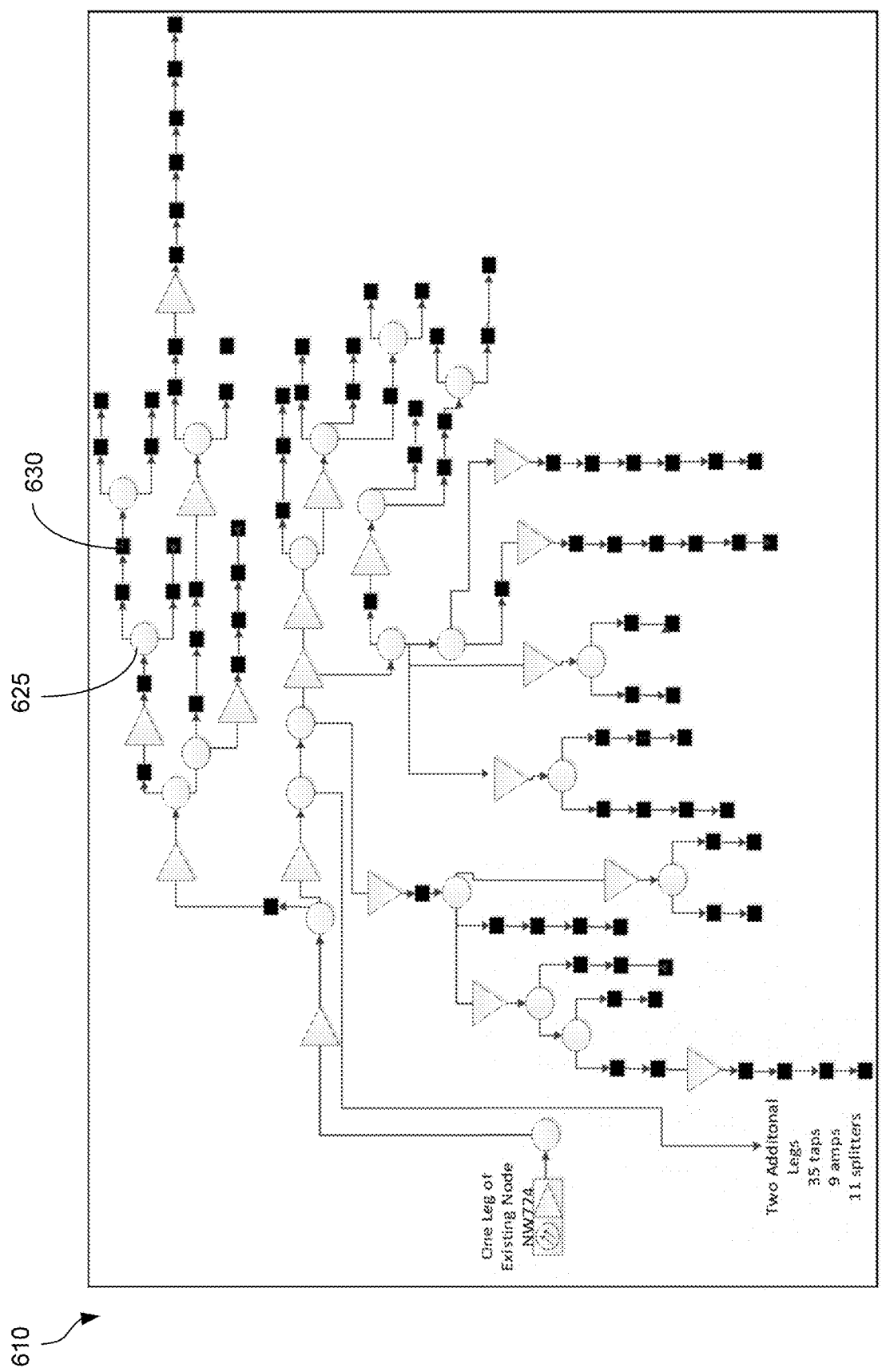
FIG. 6B illustrates noise propagation in a second exemplary large amplifier network for a cable provider according to one or more aspects of the disclosed subject matter.

FIGS. 6A and 6B illustrate noise propagation in a large amplifier networks. Networks with cascaded and branched amplifiers suffer from output noise accumulation in the upstream direction. Degradation is a function of the number of amplifiers in a distribution leg and could be very significant. Accordingly, a solution for the noise accumulation is to remove noise at each repeater in frequencies that are not used by its input signal, as further described herein.

FIG. 6A illustrates noise propagation in a first exemplary large amplifier network 605 for a cable provider according to one or more aspects of the disclosed subject matter. For example, the large amplifier network 605 can include a maximum of 12 amplifiers including 2 dual output amplifiers per leg, a maximum of 4 amplifiers in a row, and a plurality of couplers creating many branches. Further, each circle in FIG. 6A represents a splitter/coupler (e.g., splitter 615), and each square represents a tap (e.g., tap 620).

FIG. 6B illustrates noise propagation in a second exemplary large amplifier network 610 for a cable provider according to one or more aspects of the disclosed subject matter. The second large amplifier network 610 can include 27 amplifiers including 1 dual output amplifier per leg, and a plurality of couplers creating many branches. Further, each circle in FIG. 6B represents a splitter/coupler (e.g., splitter 625), and each square represents a tap (e.g., tap 630). For example, in this case, because there are 27 amplifiers, the uncanceled echo will be amplified by 27.

However, there can be a scheduler that allocates frequencies from the frequency band to different CMs to transmit simultaneously in different frequencies. Additionally, all of the CMs in the large amplifier networks are assigned different frequencies to transmit simultaneously. For example, in a predetermined node (e.g., the node for the large amplifier network in FIG. 6B), there will be some frequencies that are not used by the CMs here because those frequencies are being used by the CMs at other branches of the network. Accordingly, based on the frequency response here, all the frequencies that are not used can be identified. These frequencies that are not used will still include the uncanceled echo and/or not include the signal. As a result, after the frequencies that are not being used are identified, the noise (and uncancelled echo) can be cleaned. For example, the cleaning can correspond to distinguishing between frequencies that are being used in a branch and frequencies that are not being used in that branch, and all the frequencies that are not being used are set to zero and the corresponding noise can be removed accordingly. In this case, the signal at the node will only include uncanceled echo that is a result of amplifiers that are successive. For example, referring to a row of amplifiers, the echo cannot be cleaned for all the amplifiers in a row. Accordingly, even if there are 27 amplifiers but only 5 of them are in a row (e.g., FIG. 6B), there will be a 5 times penalty for the noise propagation, but there is not a 27 times penalty. In other words, the noise is improved to 5 divided by 27 (i.e., 18% of noise without the cleaning is applied).

FIGS. 7A-7D illustrate a noise reduction implementation according to one or more aspects of the disclosed subject matter. In one embodiment, the noise reduction block 550 can be configured to implement the noise reduction.

Figure 7A:
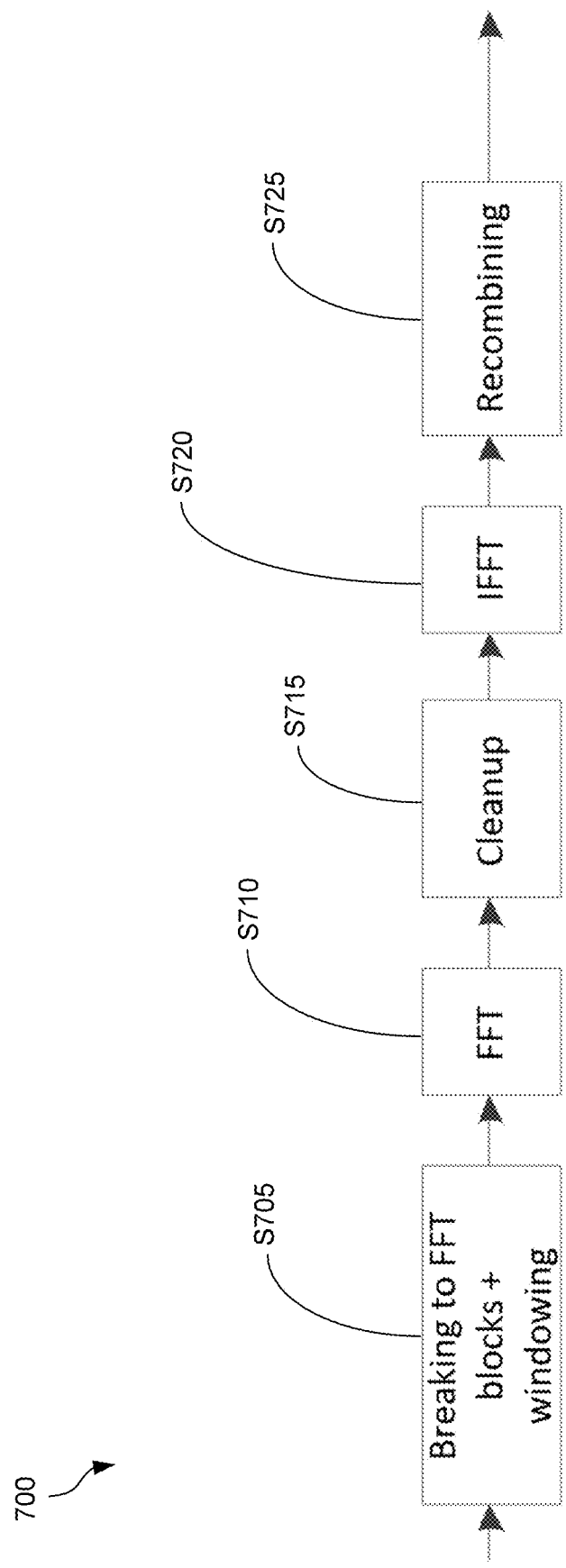
FIG. 7A illustrates an exemplary workflow for noise reduction according to one or more aspects of the disclosed subject matter.

FIG. 7A illustrates an exemplary workflow 700 for noise reduction according to one or more aspects of the disclosed subject matter. In order to reduce noise enhancement, each repeater tries to remove noise in frequencies that are not used by its input signal as further described herein. Generally, the upstream signal after the echo canceller (e.g., the echo canceller 540) is multiplied by a 100% raised cosine window (S705) and is converted into frequency domain via Fast Fourier Transform (FFT) (S710). Energy in each FFT bin is compared with a pre-configured threshold and is zeroed when it is below the threshold (S715). Then, the signal is converted back to time domain with an inverse FFT (IFFT) (S720) and recombined (S725).

Figure 7B:
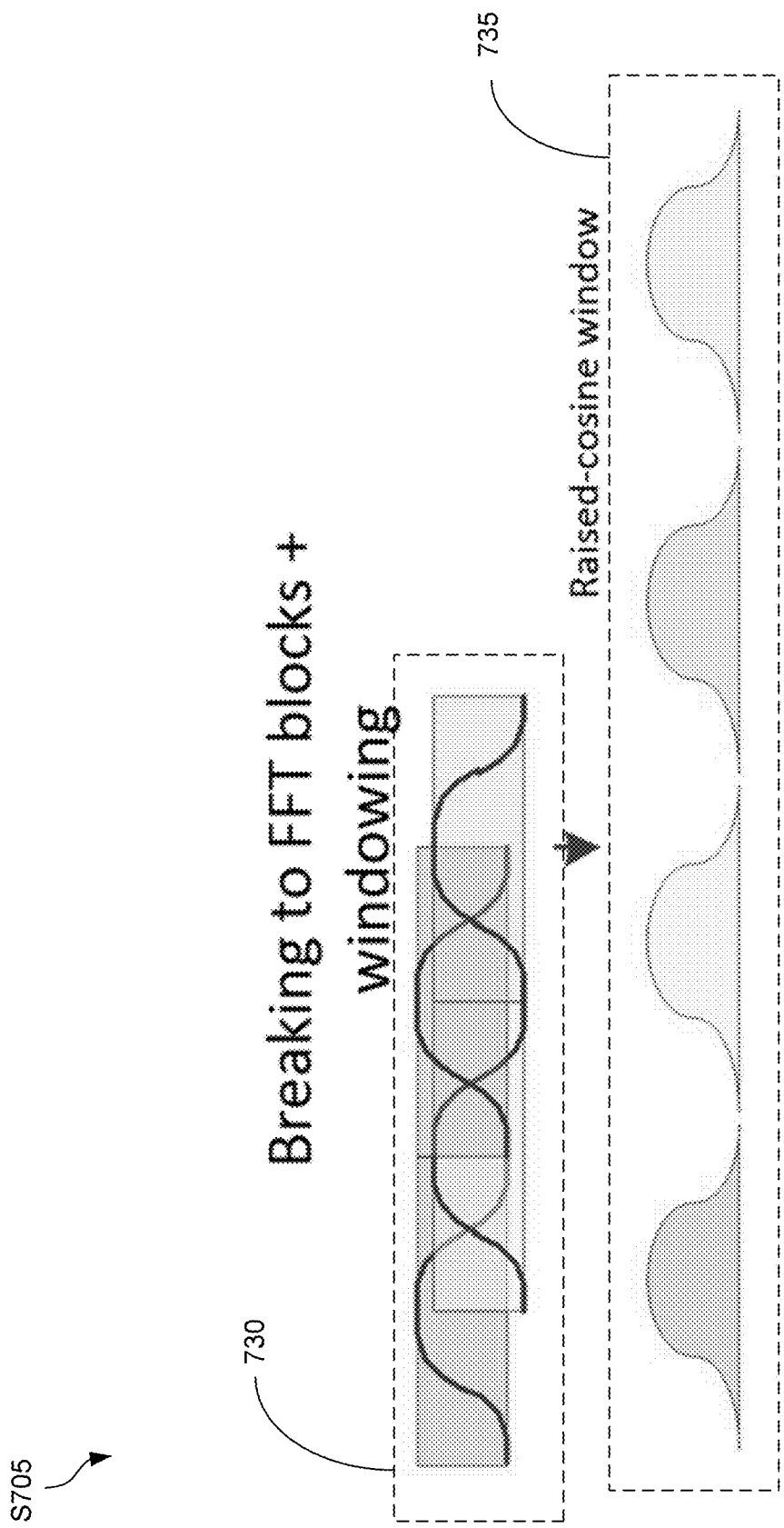
FIG. 7B illustrates an upstream signal being broken in FFT blocks and windowing according to one or more aspects of the disclosed subject matter.

FIG. 7B illustrates an upstream signal being broken into overlapping FFT blocks, which 50% overlapping each block is multiplied by a windowing function (i.e., S705) according to one or more aspects of the disclosed subject matter. More specifically, the upstream signal after the echo canceller (i.e., upstream signal 730) is multiplied by a 100% raised cosine window, which is symmetrical, and the output corresponds to output 735. In one embodiment, the block size for windowing and FFT can be 1024 samples.

Figure 7C:
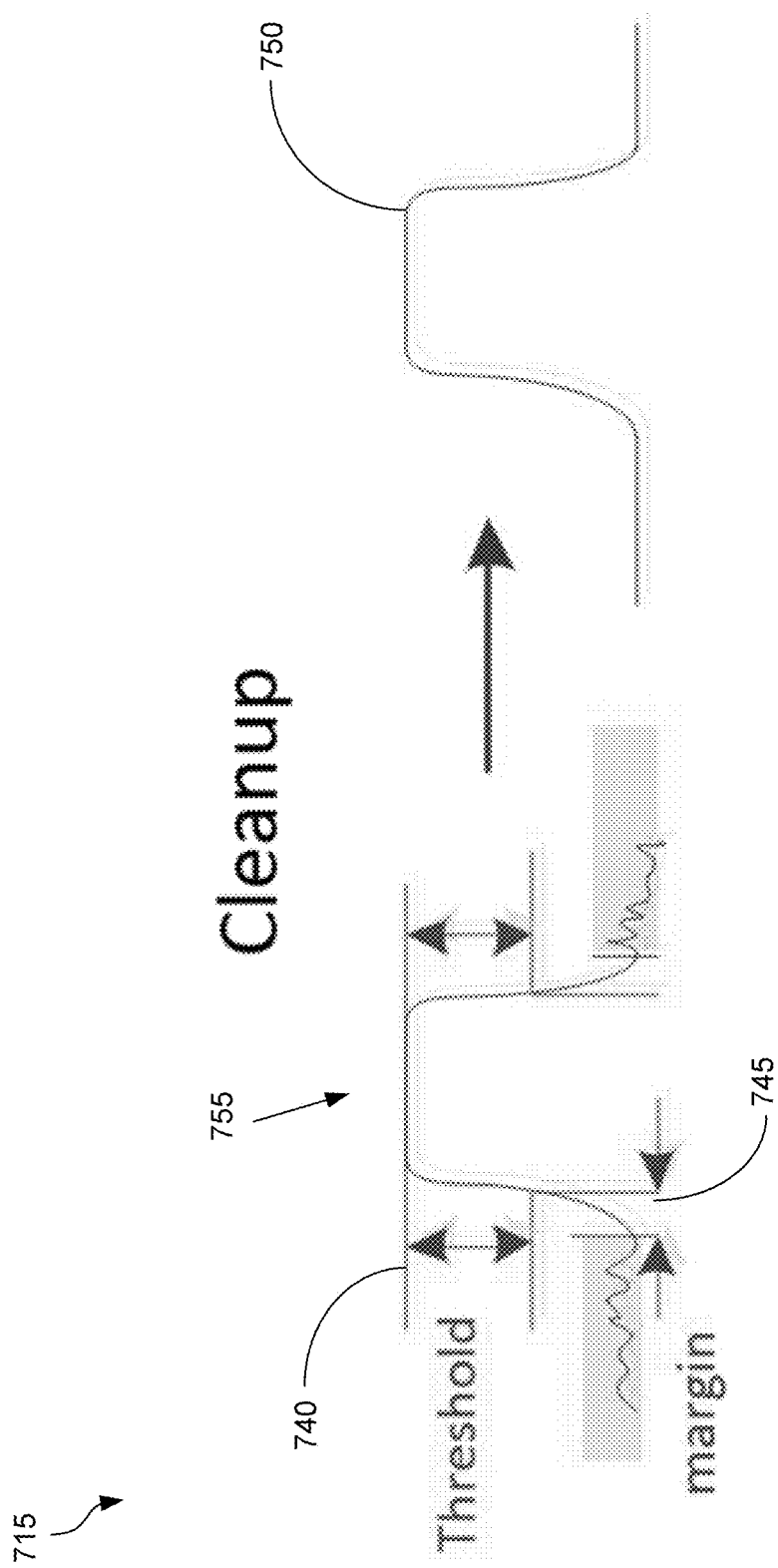
FIG. 7C illustrates a cleanup of an FFT block according to one or more aspects of the disclosed subject matter.

FIG. 7C illustrates a cleanup (i.e., S715) of an FFT block (e.g., FFT block 755) according to one or more aspects of the disclosed subject matter. It should be appreciated that the cleanup can be performed for each FFT block. The cleanup corresponds to zeroing all FFT bins below a threshold 740. The threshold can be set based on the receive level set point which is ranged to be flat over all orthogonal frequency-division multiple access (OFDMA) channels (e.g., 5 dBmV/6.4 MHz). Additionally, there is no zeroing performed in the margin area 745. Accordingly, the cleanup output 755 corresponds to a zeroed FFT block.

Figure 7D:
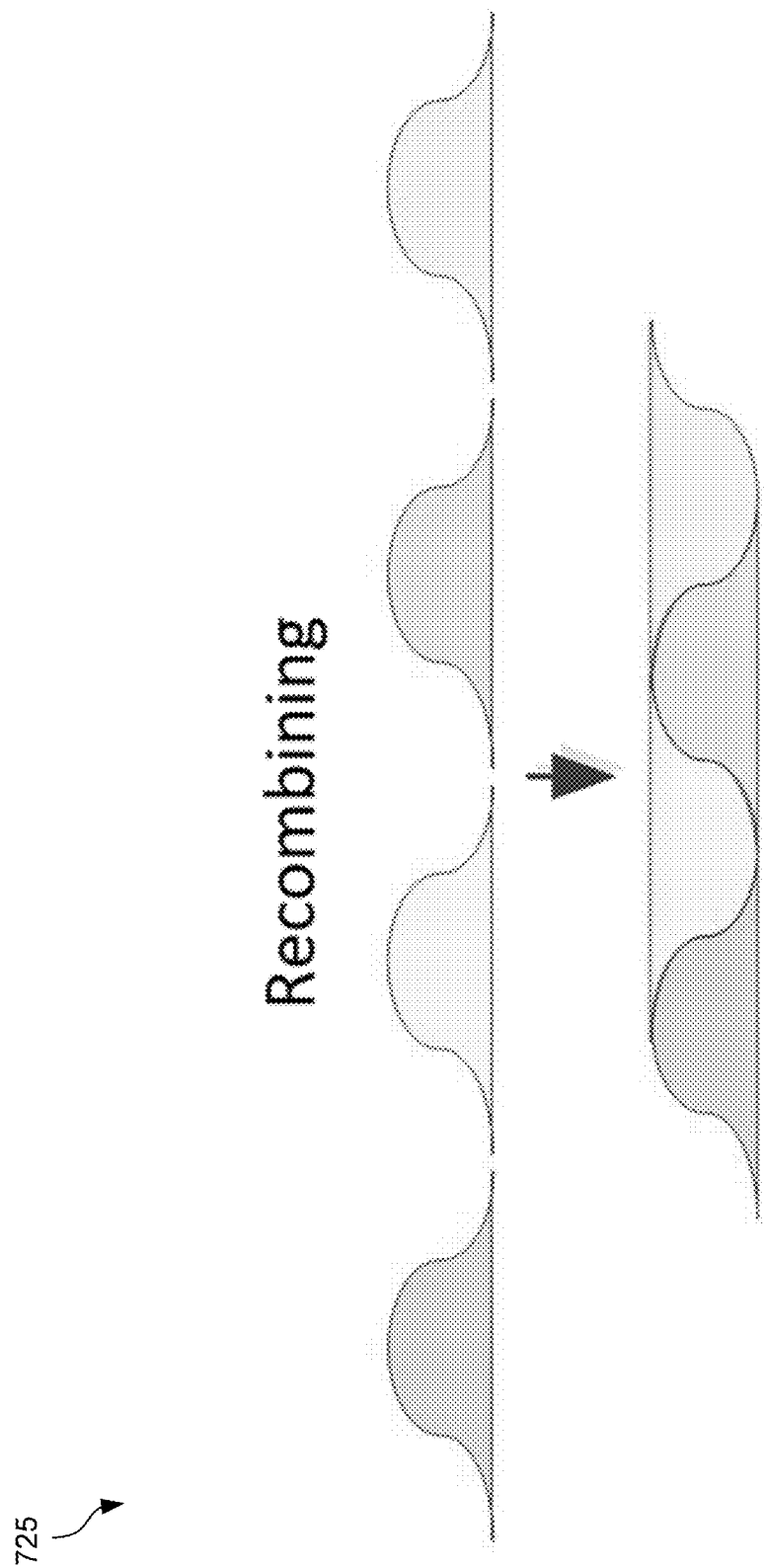
FIG. 7D illustrates recombining the FFT bins according to one or more aspects of the disclosed subject matter.

FIG. 7D illustrates recombining (i.e., S720) the FFT bins according to one or more aspects of the disclosed subject matter. After the FFT bins are zeroed, the FFT block undergoes IFFT to be converted back to the time domain. After being converted back to the time domain, the FFT blocks are recombined by summing every two consecutive blocks of 512 samples. As a result, perfect signal regeneration can be achieved with the symmetric window function.

TABLE 1

| Mode | SNR at the Node EC output (dB) | | Noise Reduction (dB) | |
| --- | --- | --- | --- | --- |
| | Cable provider 1 | Cable provider 2 | Cable Provider 1 | Cable Provider 2 |
| 1 | 33.0 | 32.2 | 4.8 | 7.1 |
| 2 | 32.5 | 32.4 | 4.3 | 7.3 |
| 3 | 31.3 | 31.7 | 3.1 | 6.6 |
| 4 | 28.2 | 25.1 | 0.0 | 0.0 |

Table 1 summarizes results of a simulated performance for four optional implementations in a Node+5 network. Mode 1 corresponds to ideal noise reduction. Mode 2 corresponds to noise reduction done on each bridger amplifier input (i.e., ADC and EC per input). Mode 3 corresponds to noise reduction done after leg combining (i.e., a single ADC and a single EC). Mode 4 corresponds to noise reduction not being applied. Additionally, the upstream modulated error ratio (MER) of a single repeater was 40 dB.

Figure 7E:
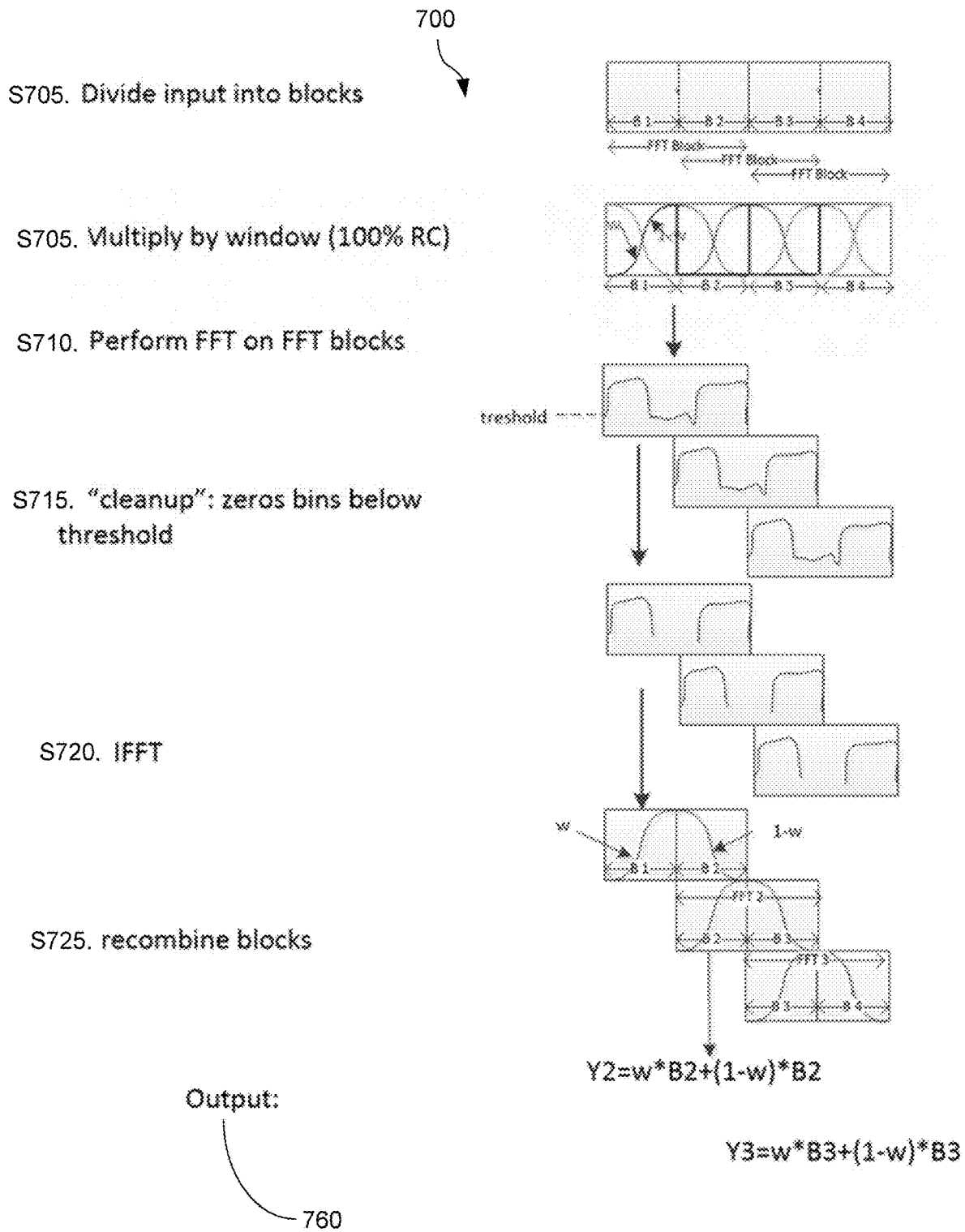
FIG. 7E illustrates a visual workflow corresponding to the workflow for noise reduction according to one or more aspects of the disclosed subject matter.

FIG. 7E illustrates a visual workflow 700 corresponding to the workflow for noise reduction according to one or more aspects of the disclosed subject matter. Additionally, FIG. 7E includes an exemplary output 765 according to one or more aspects of the disclosed subject matter.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. A full duplex repeater, comprising:
an echo canceller in an upstream direction; and
noise reduction circuitry configured to
  receive an upstream signal from the echo canceller,
  separate the upstream signal into a plurality of overlapping blocks,
  multiply the overlapping blocks by a 100% raised cosine window,
  convert the upstream signal into frequency domain using FFT, clean predetermined portions of the upstream signal in the FFT blocks based on a predetermined threshold,
convert the upstream signal from frequency domain to time domain using Inverse FFT; and
recombine the FFT blocks.

2. The full duplex repeater according to claim 1, wherein the predetermined portions correspond to FFT bins, and cleaning the predetermined portions of the upstream signal in the FFT blocks includes zeroing the energy in each FFT bin when it is below the predetermined threshold.

3. The full duplex repeater according to claim 2, wherein the threshold is set according to a receive level set point which is ranged to be flat over all orthogonal frequency-division multiple access (OFDMA) channels.

4. The full duplex repeater according to claim 2, wherein there is no cleaning in a margin area of the FFT block.

5. The full duplex repeater according to claim 1, wherein the full duplex repeater chip is connected to a node, wherein the node is pre-configured with a predetermined output frequency and gain.

6. The full duplex repeater according to claim 1, further comprising circuitry configured to
perform automatic equalization implemented using a frequency domain adaptive filter (FDAF).

7. The full duplex repeater according to claim 6, wherein, upon reset of the full duplex repeater, the circuitry for performing the automatic equalization is configured to
wait for a received wideband signal at a north port, wherein the north port faces a node,
measure an input frequency response, wherein the input frequency response corresponds to an energy per FFT bin,
adjust equalizer coefficients to maintain a predetermined frequency response and gain,
after achieving a predetermined accuracy, open a downstream path for transmissions, and
move into a steady state.

8. The full duplex repeater according to claim 7, wherein, in the steady state, the circuitry for performing the automatic equalization is further configured to
measure energy on selected frequencies,
calculate gain and cable response, and
adjust the filter coefficients with a programmable step size.

9. The full duplex repeater according to claim 7, wherein moving into a steady state is in response to a command from a cable modem or occurs autonomously based on a predetermined waiting time.

10. The full duplex repeater according to claim 7, wherein the circuitry is further configured to
shape an adaptive uptilt in an upstream path based on a calculated frequency response, an upstream signal in the upstream path being configured to arrive at a next receiver in the upstream direction with a predefined spectrum based on the shaped adaptive uptilt.

11. A method for noise reduction in a full duplex repeater, comprising:
receiving an upstream signal from an echo canceller in an upstream direction;
separating the upstream signal into a plurality of overlapping blocks;
multiplying the overlapping blocks by a 100% raised cosine window;
converting the upstream signal into frequency domain using FFT;
cleaning predetermined portions of the upstream signal in the FFT blocks based on a predetermined threshold;
converting the upstream signal from frequency domain to time domain using Inverse FFT; and
recombining the FFT blocks.

12. The method of claim 11, wherein the predetermined portions correspond to FFT bins, and cleaning the predetermined portions of the upstream signal in the FFT blocks includes zeroing the energy in each FFT bin when it is below the predetermined threshold.

13. The method of claim 12, wherein the threshold is set according to a receive level set point which is ranged to be flat over all orthogonal frequency-division multiple access (OFDMA) channels, or there is no cleaning in a margin area of the FFT block.

14. The method of claim 11, wherein the full duplex repeater is connected to a node, wherein the node is pre-configured with a predetermined output frequency and gain.

15. The method of claim 11, further comprising:
performing automatic equalization implemented using a frequency domain adaptive filter (FDAF).

16. The method of claim 15, upon reset of the repeater, further comprising:
waiting for a received wideband signal at a north port, wherein the north port faces a node;
measuring an input frequency response, wherein the input frequency response corresponds to an energy per FFT bin;
adjusting equalizer coefficients to maintain a predetermined frequency response and gain;
after achieving a predetermined accuracy, opening a downstream path for transmissions; and
moving into a steady state.

17. The method of claim 16, when in the steady state, further comprising:
measuring energy on selected frequencies;
calculating gain and cable response; and
adjusting the filter coefficients with a programmable step size.

18. The method of claim 16, wherein moving into a steady state is in response to a command from a cable modem or occurs autonomously based on a predetermined waiting time.

19. The method of claim 16, further comprising:
shaping an adaptive uptilt in an upstream path based on a calculated frequency response, an upstream signal in the upstream path being configured to arrive at a next receiver in the upstream direction with a predefined spectrum based on the shaped adaptive uptilt.

20. A system comprising:
a memory; and
at least one processor configured to:
receive an upstream signal from an echo canceller in an upstream direction;
separate the upstream signal into a plurality of overlapping blocks;
multiply the overlapping blocks by a 100% raise cosine window;
convert the upstream signal into frequency domain using FFT;
clean predetermined portions of the upstream signal in the FFT blocks based on a predetermined threshold;
convert the upstream signal from frequency domain to time domain using Inverse FFT; and
recombine the FFT blocks.

* * * * *

UNITED STATES PATENT AND TRADEMARK OFFICE
CERTIFICATE OF CORRECTION

| | |
|---|---|
| PATENT NO. | : 10,938,444 B2 |
| APPLICATION NO. | : 16/544956 |
| DATED | : March 2, 2021 |
| INVENTOR(S) | : Avraham Kliger et al. |

It is certified that error appears in the above-identified patent and that said Letters Patent is hereby corrected as shown below:

In the Claims

Column 12, Line 56 (Claim 20): Replace "raise" with --raised--.

Signed and Sealed this
Fourth Day of January, 2022

Drew Hirshfeld
*Performing the Functions and Duties of the*
*Under Secretary of Commerce for Intellectual Property and*
*Director of the United States Patent and Trademark Office*